United States Patent
Murahari et al.

(10) Patent No.: US 8,391,237 B2
(45) Date of Patent: Mar. 5, 2013

(54) APPARATUS AND METHOD FOR OBTAINING INFORMATION ON NEIGHBOR NETWORK FOR VERTICAL HANDOVER IN A WIRELESS COMMUNICATION SYSTEM

(75) Inventors: Vadapalli Murahari, Suwon-si (KR); Jeong-Jae Won, Hwaseong-si (KR); Young-Seok Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 911 days.

(21) Appl. No.: 12/283,056

(22) Filed: Sep. 9, 2008

(65) Prior Publication Data

US 2009/0067385 A1    Mar. 12, 2009

(30) Foreign Application Priority Data

Sep. 10, 2007  (KR) .................. 10-2007-0091405

(51) Int. Cl.
*H04W 4/00* (2009.01)
(52) U.S. Cl. ....................... 370/331; 455/437
(58) Field of Classification Search .............. 370/331; 455/437; 709/222, 228
See application file for complete search history.

(56) References Cited

U.S. PATENT DOCUMENTS

| | | |
|---|---|---|
| 2006/0259598 A1* | 11/2006 | Kim et al. ............... 709/222 |
| 2007/0183365 A1 | 8/2007 | Ohba et al. |
| 2008/0069049 A1* | 3/2008 | Olvera-Hernandez et al. ............. 370/331 |
| 2008/0305799 A1* | 12/2008 | Zuniga et al. ............ 455/437 |
| 2010/0131663 A1* | 5/2010 | Lee et al. ............... 709/228 |

FOREIGN PATENT DOCUMENTS

| | | |
|---|---|---|
| KR | 10-2007-0079289 | 8/2007 |
| KR | 10-0813586 B1 | 3/2008 |
| KR | 10-2008-0054983 | 6/2008 |

OTHER PUBLICATIONS

Draft IEEE Standard for Local and Metropolitan Area Networks: Media Independent Handover Services, IEEE P802.21/D01.00, Mar. 2006, pp. 22-48 (27 pages).*

* cited by examiner

*Primary Examiner* — Albert T Chou

(57) ABSTRACT

A wireless communication system supporting Media Independent Handover (MIH) is provided. The system comprises an MIH Function (MIHF) for receiving an MIH query message requesting Layer-2 (L2) information from an MIHF of a neighbor network, and extracting the contents of the query from the MIH query message, a converter for transmitting a network specific request message which contains the contents of the query, and a point of attachment (PoA) for providing the L2 information which is requested by the network specific request message.

20 Claims, 4 Drawing Sheets

APPARATUS AND METHOD FOR OBTAINING INFORMATION ON NEIGHBOR NETWORK FOR VERTICAL HANDOVER IN A WIRELESS COMMUNICATION SYSTEM

CROSS-REFERENCE TO RELATED APPLICATION(S) AND CLAIM OF PRIORITY

This application claims the benefit under 35 U.S.C. §119(a) of a Korean patent application filed in the Korean Intellectual Property Office on Sep. 10, 2007 and assigned Serial No. 2007-91405, the entire disclosure of which is hereby incorporated by reference.

TECHNICAL FIELD OF THE INVENTION

The present invention relates to a wireless communication system. More particularly, the present invention relates to an apparatus and method for obtaining information on neighbor networks in a wireless communication system.

BACKGROUND OF THE INVENTION

With the development of wireless communication technologies for ensuring mobility, wireless communication systems with various standards have already been proposed and new wireless communication systems are being studied. A wireless communication system is designed to support user terminals accessing a core network through an air channel. That is, from the point of view of the end-to-end elements which are a service user and a service provider, it does not matter which standard is employed by a wireless communication system in using contents. Accordingly, a technique for maintaining a satisfactory condition of an air connection by enabling the performance of a seamless handover between different networks of different mediums is being studied.

There exists the Institute of Electrical and Electronics Engineers (IEEE) 802.21 Media Independent Handover (MIH) as a typical technique of handover between different networks. This is a vertical handover. According to the MIH standard, an MIH server, an MIH function (MIHF) of a mobile terminal (MT) and an MIHF of an access network are in existence to support a seamless vertical handover. Herein, the MIH server is an entity for collecting information on various networks and providing the information to the MTs. The MIHF is a function for exchanging commands and information for vertical handover, and is included in an MT and an access network respectively.

The vertical handover based on the MIH standard is performed as follows. If an MT recognizes that link condition with a serving network becomes worse, an MIHF of the MT accesses an MIH server and obtains information on neighbor networks. The MIHF of the MT scans candidate networks, selects a target network, and initiates the vertical handover. Hence, the MIHF of the MT requests a MIHF of the serving network to provide resource information of the candidate networks, and the MIHF of the serving network requests MIHFs of the candidate networks to provide resource information. Therefore, the MIHFs of the candidate networks check resource information, and provide the MIHF of the serving network with the resource information.

Herein, the resource information which is provided to the MIHF of the serving network from the MIHF of the candidate network is a Layer-2 (L2) resource information of a point of attachment (PoA) which is subordinated to the candidate network. The L2 resource information is information on the resource of a Media Access Control (MAC) layer, and is formed dependent on the network. However, the MIH is operative in a different layer from L2. That is, the MIHF may not collect the L2 resource information directly. However, a procedure that the MIHF of the candidate network collects the L2 resource information and provides the L2 resource information to the MIHF of the serving network has not been suggested. Therefore, it is necessary to suggest a way to exchange the L2 resource information between MIHFs.

SUMMARY OF THE INVENTION

To address the above-discussed deficiencies of the prior art, it is a primary object of the present invention to address at least the above-mentioned problems and/or disadvantages and to provide at least the advantages described below. Accordingly, an aspect of the present invention is to provide an apparatus and method for exchanging Layer-2 (L2) information for vertical handover.

Another aspect of the present invention is to provide an apparatus and method for converting a Media Independent Handover (MIH) message into an L2 message for vertical handover.

A third aspect of the present invention is to provide an apparatus and method for converting an L2 message into an MIH message for vertical handover.

In accordance with an aspect of the present invention, a wireless communication system supporting Media Independent Handover (MIH) is provided. The system includes an MIH function (MIHF) for receiving an MIH query message requesting Layer-2 (L2) information from an MIHF of a neighbor network, and extracting the contents of a query from the MIH query message, a converter for transmitting a network specific request message which contains the contents of the query, and a point of attachment (PoA) for providing the L2 information which is requested by the network specific request message.

In accordance with another aspect of the present invention, an apparatus for a point of service (PoS) in a wireless communication system supporting MIH is provided. The apparatus includes an MIHF for receiving an MIH query message requesting L2 information from an MIHF of a neighbor network, and extracting contents of the query from the MIH query message, and a converter for transmitting a network specific request message which contains the contents of the query.

In accordance with a further aspect of the present invention, an operating method for a PoS in a wireless communication system supporting MIH is provided. The method includes receiving an MIH query message requesting L2 information from an MIHF of a neighbor network, extracting contents of the query from the MIH query message, and transmitting a network specific request message which contains the contents of the query.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. Also, descriptions of well-known functions and constructions will be omitted for clarity and conciseness.

Hereinafter, a technique for converting between a Media Independent Handover (MIH) message and a Layer-2 (L2) message for vertical handover will be described. Herein, the L2 denotes a Media Access Control (MAC) layer, and has a structure which is dependent upon a network standard.

Figure 1:
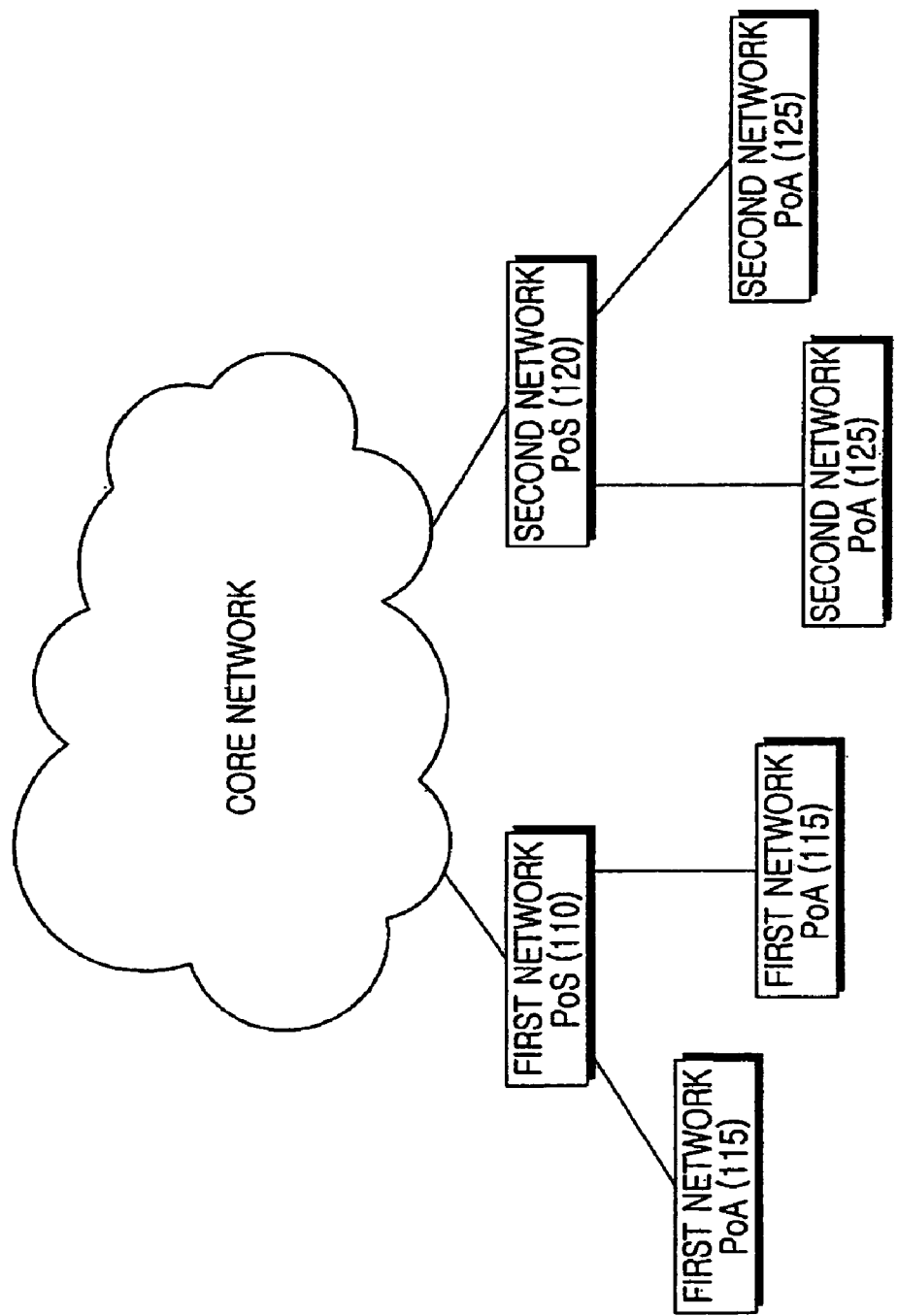
FIG. 1 illustrates a schematic configuration of a wireless communication system according to an exemplary embodiment of the present invention.

FIG. 1 illustrates a schematic configuration of a wireless communication system according to an exemplary embodiment of the present invention.

Referring to FIG. 1, the wireless communication system according to an exemplary embodiment of the present invention includes a first network point of service (PoS) 110, a second network PoS 120, a first network point of attachment (PoA) 115, and a second network PoA 125.

The first network PoS 110 and the second network PoS 120 are in charge of connection with a core network in the first network and the second network respectively, and operate in upper position of a plurality of PoAs. The first network PoA 115 and the second network PoA 125 are in charge of L2 connection in the first network and the second network respectively.

Figure 2:
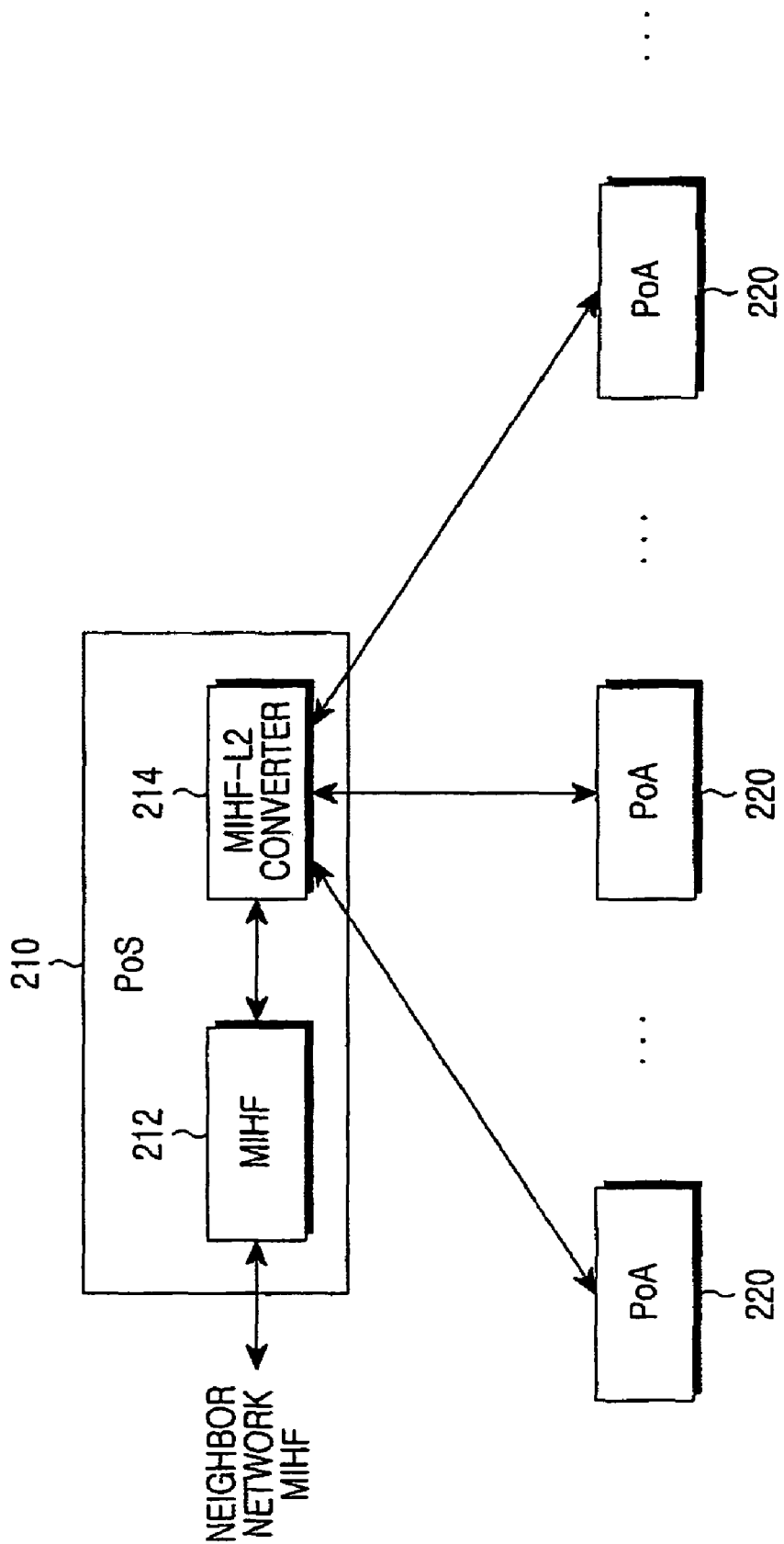
FIG. 2 is a block diagram of a point of service (PoS) in a wireless communication system according to an exemplary embodiment of the present invention.

FIG. 2 is a block diagram of a PoS 210 in a wireless communication system according to an exemplary embodiment of the present invention.

Referring to FIG. 2, the PoS 210 includes an MIH function (MIHF) 212, and an MIHF-L2 converter 214.

Figure 3A:
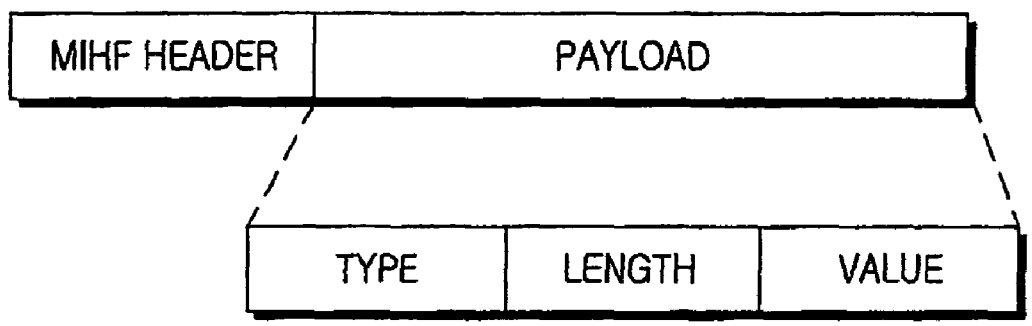
FIGS. 3A to 3C illustrate structures of messages for exchanging information on neighbor networks in a wireless communication system according to an exemplary embodiment of the present invention.
Figure 3B:
Figure 3C:

The MIHF 212 exchanges commands and information for vertical handover with MIHFs of neighbor networks and MIHFs of MTs. For instance, the MIHF 212 receives and analyzes a resource query message, and generates and transmits a response messages to the resource query message. Particularly, when the resource query message is received, the MIHF 212 parses contents of the query and provides the MIHF-L2 converter 214 with the contents of the query. For example, the resource query message contains an MIHF header and a payload as shown in FIG. 3A, and the payload is a Type Length Value (TLV) representing the contents of the query. That is, the MIHF 212 extracts the TLV as shown FIG. 3B from the resource query message as shown FIG. 3A, and provides the MIHF-L2 converter 214 with the TLV. Herein, the contents of the query represented by the TLV could be L2 resource information, L2 security information, or any other L2 specific information.

The MIHF-L2 converter 214 performs a function for interfacing between the MIHF 212 and an access network. Specifically, the MIHF-L2 converter 214 constructs a network specific request message which contains the contents of the query provided from the MIHF 212, and transmits the network specific request message to a PoA 220. The MIHF-L2 converter 214 analyzes a network specific response message received from the PoA 220, and provides the MIHF 212 with analyzed information. For example, the MIHF-L2 converter 214 receives the contents of the query as shown FIG. 3B, and constructs and transmits the network specific request message which contains access network specific header and value as shown FIG. 3C. In other words, the MIHF-L2 converter 214 constructs the network specific request message by extracting a value from the TLV and adding a network specific header and the value. Herein, the network specific request message transmitted by the MIHF-L2 converter 214 may contain a plurality of L2 information requests.

Figure 4:
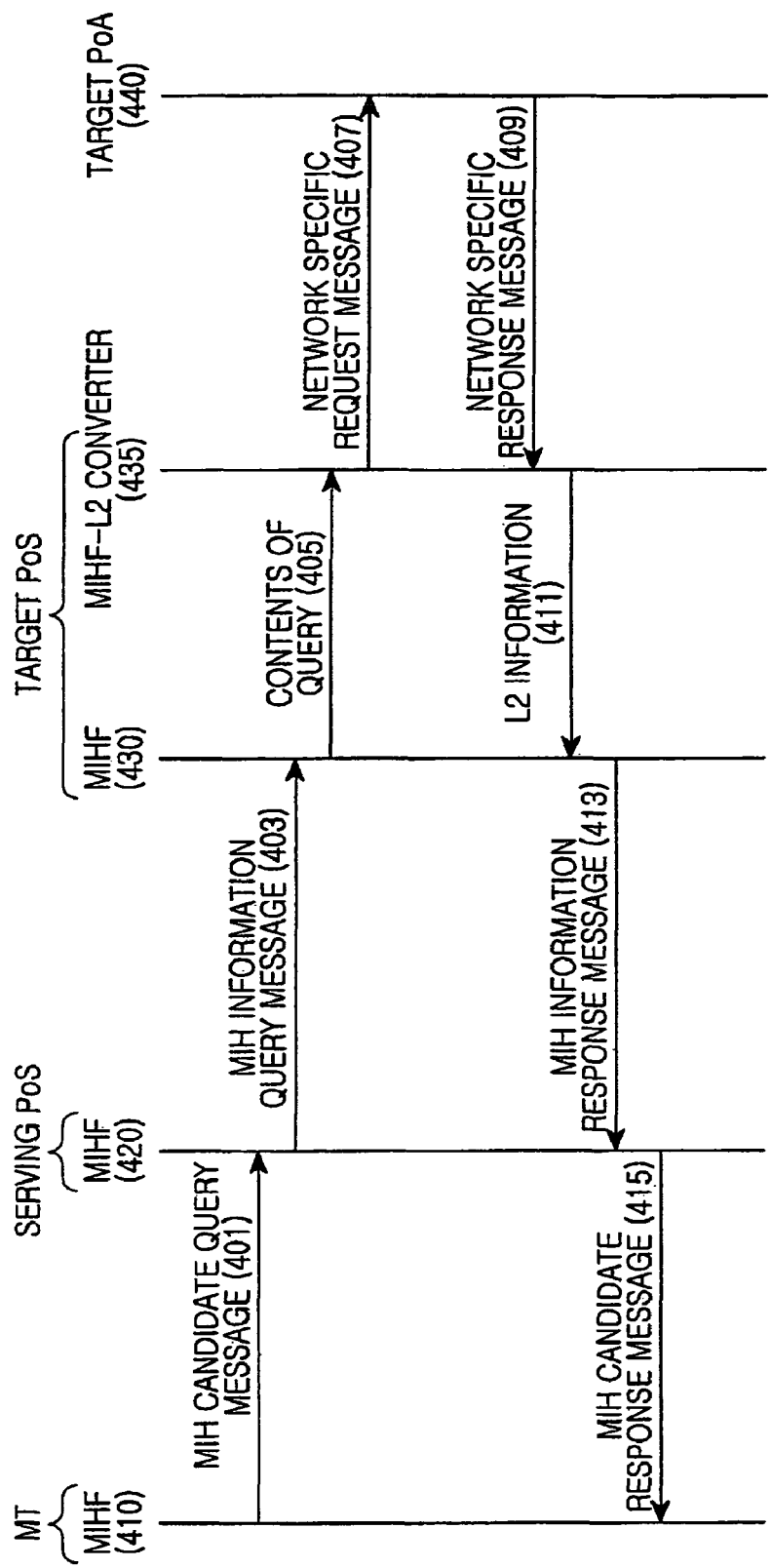
FIG. 4 illustrates a signal exchange for exchanging information on neighbor networks in a wireless communication system according to an exemplary embodiment of the present invention.

FIG. 4 illustrates signal exchange for exchanging information on neighbor networks in a wireless communication system according to an exemplary embodiment of the present invention.

Referring to FIG. 4, MIHF of an MT 410 transmits an MIH candidate query message to an MIHF of serving PoS 420 in step 401. The MIH candidate query message could be called an 'MIH_MN_HO_Candidate_Query.request'.

The MIHF of serving PoS 420, which receives the MIH candidate query message, transmits the MIH information query message to an MIHF of target PoS 430 in step 403. The MIH information query message contains TLV for requesting L2 information, and the L2 information requested by the TLV could be L2 resource information, L2 security information, or any other L2 specific information. In the case of requesting L2 resource information, the MIH information query message could be called an 'MIH_MN_HO_Query_Resource.request'.

The MIHF of target PoS 430, which receives the MIH information query message, parses the contents of the query, that is, the TLV and provides an MIHF-L2 converter of target PoS 435 with the TLV in step 405. The contents of the query could be called an 'L2 Specific Request'.

The MIHF-L2 converter of target PoS 435, which receives the contents of the query, constructs a network specific request message which contains the contents of the query, and transmits the network specific request message to target PoA 440 in step 407. Herein, the network specific request message may contain a plurality of L2 information requests.

The target PoA 440, which received the network specific request message, checks L2 information which is requested by the network specific request message, and transmits a network specific response message which contains the L2 information to the MIHF of target PoS 430 in step 409.

The MIHF-L2 converter of target PoS 435, which received the network specific response message, generates TLV representing the L2 information, and provides the MIHF of target PoS 430 with the TLV in step 411.

The MIHF of target PoS 430, which receives the TLV, generates an MIH information response message which contains the TLV representing the L2 information, and transmits the MIH information response message to the MIHF of serving PoS 420 in step 413. That is, the L2 information is encapsulated in the payload of the MIH information response message. In the case of requesting L2 resource information, the MIH information response message could be called an 'MIH_MN_HO_Query_Resource.response'.

The MIHF of serving PoS 420, which receives the MIH information response message, transmits an MIH candidate response message to the MIHF of the MT 410 in step 415. The MIH candidate response message could be called an 'MIH_MN_HO_Candidate_Query.response'.

According to the exemplary embodiment of the present invention described referring to FIG. 4, the MIHF-L2 converter of target PoS 435 constructs the network specific request message by using the contents of the query, and transmits the network specific request message to the target PoA 440.

However, according to another exemplary embodiment of the present invention, the MIHF of serving PoS 420 transmits an MIH information query message which contains the network specific request message as TLV. Accordingly, the MIHF-L2 converter of target PoS extracts the TLV which is the network specific request message, and transmits the TLV to the target PoA 440 without constructing the network specific request message.

At the exemplary embodiment of the present invention described above, a converting function between MIHF and L2 is included in a PoS. However, the converting function between MIHF and L2 could be performed in a separate network entity not in the PoS.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wireless communication system configured to support a Media Independent Handover (MIH), the system comprising:
an MIH function (MIHF) configured to receive an MIH query message requesting a Layer-2 (L2) information from an MIHF of a neighbor network, and to extract contents from the MIH query message;
a converter configured to generate a network specific request message by extracting at least one value from the contents and adding a network specific header and the at least one value, and transmit the network specific request message which includes the contents; and
a point of attachment (PoA) configured to provide the L2 information which is requested by the network specific request message, wherein the MIH function and the converter are included in a point of service (PoS),
wherein the PoS is configured to be in charge of a connection with a core network in a corresponding network and to operate in an upper position of a plurality of PoAs, and
wherein the PoA is configured to be in charge of an L2 connection in a corresponding network.

2. The system of claim 1, wherein the MIH function is configured to extract the contents by eliminating a header from the MIH query message.

3. The system of claim 1, wherein the contents are configured as a Type Length Value (TLV).

4. The system of claim 1, wherein the converter is configured to transmit the contents as the network specific request message.

5. The system of claim 1, wherein the network specific request message includes a plurality of L2 information requests.

6. The system of claim 1, wherein the contents include at least one of L2 resource information and L2 security information.

7. An apparatus for a point of service (PoS) in a wireless communication system supporting Media Independent Handover (MIH), the apparatus comprising:
a MIH function (MIHF) configured to receive MIH query message requesting a Layer-2 (L2) information from an MIH function of a neighbor network, and extract contents from the MIH query message; and
a converter to generate a network specific request message by extracting at least one value from the contents and adding a network specific header and the at least one value, and to transmit a network specific request message which includes the contents,
wherein the MIH function and the converter are included in a point of service (PoS),
wherein the PoS is configured to be in charge of a connection with a core network in a corresponding network and configured to operate in an upper position of a plurality of PoAs, and
wherein the PoA is configured to be in charge of a L2 connection in a corresponding network.

8. The apparatus of claim 7, wherein the MIH function configured to extract the contents by eliminating a header from the MIH query message.

9. The apparatus of claim 7, wherein the contents are configured as a Type Length Value (TLV).

10. The apparatus of claim 7, wherein the converter is configured to transmit the contents as the network specific request message.

11. The apparatus of claim 7, wherein the network specific request message includes a plurality of L2 information requests.

12. The apparatus of claim 7, wherein the converter is configured to receive a network specific response message which includes the L2 information that is received from the point of service, and to provide the MIH function with the L2 information, and
wherein the MIH function is configured to generate an MIH response message which includes the L2 information, and to transmit the MIH response message to the MIH function of the neighbor network.

13. The apparatus of claim 7, wherein the contents include at least one of L2 resource information and L2 security information.

14. An operating method for a point of service (PoS) in a wireless communication system supporting Media Independent Handover (MIH), the method comprising:

receiving an MIH query message requesting a Layer-2 (L2) information from an MIH function of a neighbor network;

extracting contents from the MIH query message; and generating a network specific request message by extracting at least one value from the contents and adding a network specific header and the least one value; and transmitting a network specific request message which includes the contents, wherein the MIH function and the converter are included in a point of service (PoS), wherein the PoS is in charge of a connection with a core network in a corresponding network and operates in upper position of a plurality of POAs, and wherein the PoA is in charge of a L2 connection in a corresponding network.

15. The method of claim 14, wherein the contents are extracted by eliminating a header from the MIH query message.

16. The method of claim 14, wherein the contents are configured as a Type Length Value (TLV).

17. The method of claim 14, wherein the contents are transmitted as the network specific request message.

18. The method of claim 14, wherein the network specific request message includes a plurality of L2 information requests.

19. The method of claim 14, further comprising:

receiving a network specific response message which includes the L2 information that is received from the point of service;

generating an MIH response message which includes the L2 information; and transmitting the MIH response message to the MIH function of the neighbor network.

20. The method of claim 14, wherein the contents include at least one of L2 resource information and L2 security information.

* * * * *